2,710,299

PROCESS FOR THE PRODUCTION OF CRYSTALLINE VANILLYL AMIDES

August Kottler and Ernst Seeger, Biberach an der Riss, Germany, assignors to Dr. Karl Thomae G. m. b. H., Chemischpharmazeutische Fabrik, Biberach an der Riss, Germany, a firm No Drawing. Application October 22, 1951, Serial No. 252,574

Claims priority, application Germany October 21, 1950

14 Claims. (Cl. 260—404)

The present invention relates to a process for the production of vanillyl amides from guaiacol and the methylol amides of aliphatic saturated or unsaturated carboxylic acids with 6–12 carbon atoms.

A process has become known through the American Patent No. 1,503,631, according to which approximately molecular proportions of guaiacol and methylol amides of aliphatic acids are reacted at room temperature using anhydrous zinc chloride or concentrated sulphuric acid as condensation agent. The final product which is obtained by the known process is undefined and non-homogeneous in its composition. Apart from this the yield is unsatisfactory.

It has now been found, that homogeneous, well-defined, crystalline vanillyl amides can be obtained from guaiacol and the methylol amides of aliphatic saturated or unsaturated carboxylic acids with 6–12 carbon atoms per molecule by using an excess of guaiacol and a solution of alcoholic hydrochloric acid as condensation agent. The reaction preferably takes place in alcoholic solution and at temperatures above 30° C.

It has now been shown that surprisingly enough the use of alcoholic hydrochloric acid solutions instead of the condensations agent used in the known process considerably reduces the formation of undesirable by-products. The resulting final products are also free of unreacted methylol amides. Hence it follows, that in the process according to the invention the reaction is almost complete, which is not the case in the known process.

Furthermore, it has been found that the resultant vanillyl amides final products, after they have been liberated from the excess guaiacol, are very easily converted into solid alkali salts, which are of important for the further purification of the products of the process. These alkali salts for example the sodium salts, can be obtained by adding to the crude vanillyl amide dissolved in methyl alcohol, a methanolic solution of an alkali hydroxide and evaporating to dryness. Also by treating the crude vanillyl amides in etheral solution with sodium ethylate one can obtain crystalline sodium salts.

The crystalline sodium salts can after purification with an organic solvent or without any special pre-treatment be dissolved in water and result through the addition of acids, particularly when by allowing carbonic acid to pass through and allowing it to stand in the cold, in pure crystalline vanillyl amides.

The general formula of the crystalline vanillyl amides obtained according to the invention is:

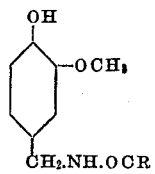

where R represents a saturated or unsaturated aliphatic radical with 5–11 carbon atoms.

In that which follows two explanatory examples will explain in greater detail how the process according to the invention is carried out.

*Example 1*

228 gr. of pelargonic acid methylol amide and 456 gr. of guaiacol are dissolved in 1700 gr. of ethanol and to this is added portion wise at 0° C. 360 gr. of a sautrated ethanolic solution of hydrochloric acid with cooling. After heating the reaction mixture for eight days at 35 degrees C., it is neutralised with anhydrous sodium carbonate and filtered off with suction from the precipitated common salt.

The guaiacol is distilled with steam from the filtrate which has been freed from the ethanol and for every 100 gr. of the thus produced crude, oily vanillyl amide, which is dissolved in 150 cm.$^3$ of methanol, there is added a solution of 13.7 gr. of sodium hydroxide in a 120 cm.$^3$ of methanol and evaporated in vacuo to dryness. The powdered sodium salt is then ground with a 3- to 4-fold quantity of warm ethyl acetate, is filtered off with suction when cold and dried.

One can also proceed by dissolving 100 gr. of amide pelargonic acid vanillyl amide in 750 cm.$^3$ of ether and then add with stirring a solution of 28 gr. of sodium ethylate in ether. The precipitated sodium salt is filtered off with suction washed with cold ether and dried.

Finally, one can also precipitate the alkali salt from 100 gr. of crude pelargonic acid vanillyl amide after dissolving in 750 cm.$^3$ of a 2.5% sodium hydroxide or potassium hydroxide solution to which is added just so much 30% sodium hydroxide or potassium hydroxide solution while stirring and cooling, as long as there is a precipitate. The well filtered-off by suction crystal sludge is dried.

The sodium salt obtained and purified as described in any of the aforementioned examples is dissolved in water with the addition of some caustic soda solution. Diluted hydrochloric acid is slowly stirred into the solution cooled to 0 degrees centigrade or a stream of carbonic acid is passed through. After standing for 24 hours a large quantity of very light, bunched crystal needles separate themselves from the resulting milky turbidity, which are filtered off by suction and treated with water.

Yield: 82% of theory on pelargonic acid vanillyl amide, M. P. 42° C.

*Example 2*

To 213 gr. of undecylenic acid methylol amide and 325 gr. of guaiacol dissolved in 1,000 cm.$^3$ of methanol are added portionwise 200 gr. of saturated methanolic hydrochloric acid solution at 0° C. with cooling.

Further procedure follows as indicated in Example 1.

Yield: 73% of theory on undecylenic acid vanillyl amide, M. P. 50° C.

What we claim is:

1. A process for the production of vanillyl amides in which excess guaiacol is reacted with a methylol amide of an acid taken from the class consisting of aliphatic saturated and unsaturated carboxylic acids having from 6–12 carbon atoms, in the presence of alcoholic hydrogen chloride solution as condensation agent substantially free from water.

2. A process as claimed in claim 1 in which the reaction is carried out in the presence of a volatile monohydric alcohol at a temperature above 30° C. and not over the boiling point of said alcohol.

3. A process for the production of vanillyl amides which comprises mixing guaiacol in substantial excess with a methylolamide of an acid taken from the class consisting of aliphatic saturated and unsaturated monocarboxylic acids having 6 to 12 carbon atoms, adding thereto an alcoholic solution of hydrochloric acid substantially free from water, heating said mixture for a sufficient time to cause a reaction to take place forming said amide.

4. A process according to claim 3 in which the temperature is about 35° C. and the time about eight days.

5. A process for the production of vanillyl amides which comprises mixing guaiacol in substantial excess with a methylolamide of pelargonic acid, adding thereto an alcoholic solution of hydrochloric acid substantially free from water, heating said mixture for a sufficient time to cause a reaction to take place forming said amide.

6. A process for the production of vanillyl amides which comprises mixing guaiacol in substantial excess with a methylolamide of undecylenic acid, adding thereto an alcoholic solution of hydrochloric acid substantially free from water, heating said mixture for a sufficient time to cause a reaction to take place forming said amide.

7. A process according to claim 3 in which the proportions by weight of guaiacol to amide are about 2 to 1.

8. A process for the production of crystalline vanillyl amides which comprises mixing an excess of guaiacol with the methylol amide of an acid taken from the class consisting of aliphatic saturated and unsaturated carboxylic acids having 6 to 12 carbon atoms, introducing as a condensation agent an alcoholic HCl solution substantially free from water, whereby a reaction takes place forming said amide, then adding an alkali to said amide to form the alkali metal salt thereof, and thereafter treating said salt with an acid to combine with said alkali metal and liberate the crystalline free amide.

9. A process as claimed in claim 8 in which the reaction is carried out in the presence of a volatile monohydric alcohol at a temperature above 30° C. and not over the boiling point of said alcohol.

10. A process as claimed in claim 8 in which said acid is carbonic acid.

11. A process for the production of crystalline vanillyl amides which comprises mixing an excess of guaiacol with the methylol amide of an acid taken from the class consisting of aliphatic saturated and unsaturated carboxylic acids having 6 to 12 carbon atoms, introducing as a condensation agent an alcoholic HCl solution substantially free from water, heating said mixture for several days at a temperature of about 30° to 80° C., whereby a reaction takes place forming said amide, then adding an alkali to said amide to form the alkali metal salt thereof, and thereafter treating said salt with an acid to combine with said alkali metal and liberate the crystalline free amide.

12. A process according to claim 11 in which the temperature is about 35° C. and the time about eight days.

13. A process for the production of crystalline vanillyl amides which comprises mixing an excess of guaiacol with the methyl amide of pelargonic acid, introducing as a condensation agent an alcoholic HCl solution substantially free from water, heating said mixture for several days at a temperature of about 30° to 80° C., whereby a reaction takes place forming said amides, then adding an alkali to said amide to form the alkali metal salt thereof, and thereafter treating said salt with an acid to combine with said alkali metal and liberate the crystalline free amide.

14. A process for the production of crystalline vanillyl amides which comprises mixing an excess of guaiacol with the methyl amide of undecylenic acid, introducing as a condensation agent an alcoholic HCl solution substantially free from water, heating said mixture for several days at a temperature of about 30° to 80° C., whereby a reaction takes place forming said amides, then adding an alkali to said amide to form the alkali metal salt thereof, and thereafter treating said salt with an acid to combine with said alkali metal and liberate the crystalline free amide.

References Cited in the file of this patent
UNITED STATES PATENTS 1,503,631      Bradner et al.      Aug. 5, 1924

OTHER REFERENCES

Einhorn, Justus: Liebig's Annalen der Chemie (vol. 343), 1905–06, pages 235–6.

Nelson: J. Am. Chem. Soc., vol. 41 (1919), pages 2122 to 2128.

Jones et al.: "J. Chem. Soc." (London), vol. 127 (1925), pages 2588 to 2598.

Beilstein: "Organische Chemie," vol. XIII (2nd sup.) (1950), page 482.